US005693306A

United States Patent [19]
Utsunomiya et al.

[11] Patent Number: 5,693,306
[45] Date of Patent: Dec. 2, 1997

[54] PRODUCTION PROCESS FOR REFINED HYDROGEN IODIDE

[75] Inventors: Atsushi Utsunomiya, Takaishi; Kenju Sasaki, Mobara; Yoshinori Tanaka, Mobara; Masahiro Omura, Mobara; Naoki Tomoshige, Mobara, all of Japan

[73] Assignee: Mitsui Toatsu Chemicals, Inc., Tokyo, Japan

[21] Appl. No.: 562,084

[22] Filed: Nov. 22, 1995

[30] Foreign Application Priority Data

Nov. 28, 1994  [JP]  Japan .................... 6-292771

[51] Int. Cl.$^6$ .................................... C01B 7/13
[52] U.S. Cl. ............... 423/488; 423/481; 423/244.01
[58] Field of Search ................ 423/488, 481, 423/244.01, 244.11, 242.1

[56] References Cited

U.S. PATENT DOCUMENTS

| | | | |
|---|---|---|---|
| 2,882,243 | 4/1959 | Milton | 423/718 |
| 4,065,513 | 12/1977 | Miller | 423/481 |
| 4,088,737 | 5/1978 | Thomas et al. | 423/240 S |
| 4,089,940 | 5/1978 | Norman et al. | 278/130 |
| 4,357,309 | 11/1982 | Arnold et al. | 423/486 |
| 4,396,591 | 8/1983 | Norman | 423/481 |
| 4,557,921 | 12/1985 | Kirsch et al. | 423/488 |
| 4,853,148 | 8/1989 | Tom et al. | 423/240 S |
| 4,933,162 | 6/1990 | Vansant et al. | 423/488 |
| 5,051,117 | 9/1991 | Prigge et al. | 95/95 |
| 5,206,195 | 4/1993 | Ando et al. | 423/701 |

FOREIGN PATENT DOCUMENTS

| | | | |
|---|---|---|---|
| 54-43480 | 12/1979 | Japan . | |
| 61-209902 | 9/1986 | Japan . | |
| 3-68417 | 3/1991 | Japan | 423/240 S |
| 3-29003 | 4/1991 | Japan . | |
| 4-330916 | 11/1992 | Japan . | |
| 6-32601 | 2/1994 | Japan | 423/240 S |

OTHER PUBLICATIONS

Database WPI, Section Ch, Week 8551, Derwent Publications Ltd., London, GB, Class A91, AN 85-322691 and SU-A-1 161 458, Jun. 1985 *Abstract*.

Database WPI, Section Ch, Week 9411, Derwent Publications Ltd., London, GB, Class E36, AN 94-086231, & JP-A-06032601, Feb. 1994 *Abstract*.

The Journal of Physical Chemistry, vol. 94, Oct. 1994 USA, pp. 8297-8302, XP 000564840, G.A. Azin et al, *Proton-loaded Zeolites, 3. H56Y, ALPO-5, and Sio2-Y:Anhydrous HX Versous Aqueous HX Treatment of Zeolite Y.*

J.W. Mellor, Mellor's Comprehensive Treatise on Inorganic and Theoretical Chemistry, vol. 2, pp. 170-173, 1960. (no month).

Booth, Inorganic Syntheses, vol. 1, pp. 159-162, 1939. (no month).

Audrieth, Inorganic Syntheses, vol. II, pp. 181-182, 1963. (no month).

*Primary Examiner*—Ngoc-Yen Nguyen
*Attorney, Agent, or Firm*—Burns, Doane, Swecker & Mathis

[57] ABSTRACT

A process for producing refined hydrogen iodide having organic components of 0.2 ppm by volume or less and water of 0.1 ppm by volume or less by contacting crude hydrogen iodide with a zeolite is disclosed. Crude hydrogen iodide is obtained by reducing iodine with a hydrogenated naphthalene, wherein all of the iodine is dissolved in advance in a portion of the hydrogenated naphthalene to prepare an iodine solution, and the reaction is carried out while adding continuously or intermittently the iodine solution to the balance of the hydrogenated naphthalene. The same operation may be repeated in succession using unreacted hydrogenated naphthalene and fresh iodide. The zeolite is contacted in advance with crude hydrogen iodide, the amount of which is at least ⅓ (weight ratio) relative to the amount of the zeolite, to convert impurities of sulfur components contained in the zeolite to hydrogen sulfide, thereby removing the sulfur components. Further, an activated carbon may be combined with the zeolite at the rear stage thereof.

23 Claims, No Drawings

PRODUCTION PROCESS FOR REFINED HYDROGEN IODIDE

BACKGROUND OF THE INVENTION

1. Field of the Invention

The present invention relates to a production process for hydrogen iodide, more specifically to a process in which iodine of a raw material is efficiently reacted to obtain crude hydrogen iodide at a good yield, and then the crude hydrogen iodide is refined to produce high purity hydrogen iodide.

Hydrogen iodide is used as a synthetic raw material for various iodides, medical intermediates or a reducing agent. Further, in recent years, it is specially spotlighted as an etching agent in a semiconductor field and is an industrially useful substance. Hydrogen halides are widely utilized as the etching agent. Among them, hydrogen iodide is paid attention in terms of the high etching performance thereof.

The process of the present invention is used, for example, for obtaining hydrogen iodide used in a semiconductor production field.

2. Description of the Related Art

In recent years, it is particularly recognized in a semiconductor field that hydrogen iodide is a substance having a very good etching performance. Hydrogen iodide to be used in such field is required to have a purity as high as 99.99 to 99.999 and to have no possibility of containing phosphorus and sulfur unlike reagents for ordinary chemical reactions.

Conventional making methods of hydrogen iodide are disclosed in Mellors Comprehensive Treatise on Inorganic and Theoretical Chemistry, Supplement 2, Part 1 edited by J. W. Mellor, p. 170 (1960), published by Longmans Co., Ltd. Among them is a method in which phosphorus or a phosphorus compound is used as a reducing agent to convert iodine to hydrogen iodide. In this method, there is a possibility that the phosphorus compound would be mixed in the product. In another method, iodine is reduced with hydrogen sulfide in the presence of water. This method has a defect in that a lot of water is mixed in the product because it uses an aqueous reaction system.

In addition to the above methods, available are a method of reducing iodine in phosphinic acid or sulfur dioxide-water system (U.S. Pat. No. 4,089,940) and a method in which iodine is hydrogenated in the presence of rhodium or iridium used as a catalyst (Japanese Patent Publication No. 54-43480). However, every method employs an aqueous reaction system, and therefore a lot of water is mixed in a hydrogen iodide gas. In a non-aqueous reaction system in which a platinum catalyst is used to hydrogenate catalytically iodine (E. R. Caley, M. G. Burforal, Inorganic Synthesis Vol. 1, p. 159 (1939), and the preceding publication edited by J. W. Mellor), the reaction temperature is as high as 300° to 500° C. In addition thereto, this method has a defect in that the reaction is slow and the conversion rate to hydrogen iodide and the yield thereof are low, and therefore it is not so suitable as an industrial production process for hydrogen iodide.

On the other hand, a process for industrially producing high purity hydrogen iodide includes a process in which iodine is reduced with organic reducing agents.

A literature in which a process for producing hydrogen iodide with organic reducing agents such as tetrahydronaphthalene is disclosed includes, for example, C. J. Hoffman, Inorganic Syntheses Collective Vol. VII, p. 180 (1963). It is described that in this process iodine is added 1/37 times as less equivalent as tetrahydronaphthalene at 200° C. or higher to react with tetrahydronaphthalene, whereby hydrogen iodide can be prepared at a yield of 90%.

However, according to research made by the present inventors, this process involves some problems. That is, since a lot of iodine vapor besides hydrogen iodide is generated from the liquid during the reaction, iodine of the raw material is not only liable to be lost but also iodine is mixed in the resulting hydrogen iodide to reduce the purity of the product, and in view of the industrial production facilities, the large-scaled treating facilities for preventing a harmful iodine vapor from diffusing to the outside of the system are required to be installed.

Further, in this reaction vapor is generated and it is very difficult to control the amount of a hydrogen iodide gas generating from the reaction liquid, so that there is a possible risk that the reaction runs away to generate a lot of hydrogen iodide for short time.

Further, since overexcessive tetrahydronaphthalene is used (37 times as much equivalent as iodine), a waste liquid containing a lot of unreacted tetrahydronaphthalene remains after the reaction. That is, only a part of a lot of tetrahydronaphthalene is consumed in this process, and a volume efficiency is very poor and uneconomical. Further, since a waste liquid containing unreacted tetrahydronaphthalene is inevitably required to be treated, it is difficult to employ the process as it is for producing hydrogen iodide industrially.

Even if these problems would be solved, resulting hydrogen iodide is usually crude hydrogen iodide containing at least about 0.5% of impurities such as water and organic components and is inadequate for using in a semiconductor field. Accordingly, it has to be refined furthermore.

However, techniques for removing impurities contained in hydrogen iodide to obtain hydrogen iodide having a high purity have not been known at all up to now.

With respect to a method of refining gas other than hydrogen iodide, for example, only the following methods are disclosed.

That is, there are disclosed in Japanese Patent Laid-Open No. 61-209902, a method in which nitrogen contained in hydrogen is removed with a mordenite type zeolite subjected to calcium ion treatment; in U.S. Pat. No. 4,557,921, a refining method of silicon tetrafluoride, in which a mordenite type zeolite is used to remove impurities such as sulfur dioxide and hydrogen halides; in Japanese Patent Publication No. 3-29003, a refining method of silicon hydride, in which a 5A type zeolite is used to remove impurities such as phosphines; in U.S. Pat. No. 5,051,117, a method of removing halosilanes contained in hydrogen with a zeolite; in Japanese Patent Laid-Open No. 4-330916, a method in which a synthetic zeolite subjected to hydrophobicity treatment is used to remove organic components contained in air; and in Japanese Patent Laid-Open No. 6-32601, a refining method of hydrogen bromide, in which a zeolite is used to remove impurities such as carbon dioxide, hydrogen chloride, oxygen, and nitrogen.

SUMMARY OF THE INVENTION

The present invention provides not only a process free of the defects in the conventional processes described above in producing hydrogen iodide, but also a process in which impurities contained in hydrogen iodide are removed to render the hydrogen iodide useful in a semiconductor field and which is industrially suitable for obtaining high purity hydrogen iodide.

Intensive investigations made by the present inventors in order to achieve the subjects described above have resulted in finding that it is very effective to carry out the reaction while adding continuously or intermittently iodine to tetrahydronaphthalene instead of reacting with heating a mixed liquid or a suspended liquid of iodine and tetrahydronaphthalene as is the case with the conventional processes described above, and further that the reaction goes on almost in the same way even when not only tetrahydronaphthalene but also other hydrogenated naphthalene are used.

In addition, it has been found that when iodine is added again to the reaction liquid after the preceding reaction, hydrogen iodide corresponding to the amount of iodine added is produced.

Further, it has been found that almost all of the tetrahydronaphthalene initially charged can be effectively used for producing hydrogen iodide without reducing the purity and the yield of resulting hydrogen iodide even when the operation described above is repeated many times in the same manner.

Also, it has been found that when thus produced hydrogen iodide containing impurities (water and organic components such as tetrahydronaphthalene and naphthalene as main impurities) is contacted with a zeolite in a gaseous phase, the impurities are adsorbed very well on the zeolite.

Further, it has been found that since contacting a zeolite with hydrogen iodide reduces sulfur components contained in the zeolite to hydrogen sulfide, which is mixed in hydrogen iodide as an impurity, treating the zeolite in advance with hydrogen iodide eliminates the sulfur.

It has been found that the integration of a series of these operations enables to provide high purity hydrogen iodide with ease and at high efficiency. Thus, the present invention has come to be completed.

That is, the present invention is characterized in that crude hydrogen iodide obtained by reducing iodine with a hydrogenated naphthalene is contacted with a zeolite in a gaseous phase to produce high purity hydrogen iodide.

When this process is used, hydrogen iodide of a required amount can readily be obtained at a required time by storing the liquid after the reaction.

This production process does not discharge a lot of a waste liquid and is notably advantageous in terms of an economy of raw materials. Accordingly, it is reasonable to say that this process is an industrially very preferable production process.

DETAILED DESCRIPTION OF THE PREFERRED EMBODIMENTS

First of all, a production process of crude hydrogen iodide will be explained.

In general, when iodine is added in one lot to a hydrogenated naphthalene such as tetrahydronaphthalene in producing hydrogen iodide by reducing iodine, a vapor of iodine is generated from the reaction liquid in large quantities while a hydrogen iodide gas is violently generated from the reaction liquid. This phenomenon takes place almost similarly when a hydrogenated naphthalene is added to iodine or when the hydrogenated naphthalene is added to a solution or suspended liquid containing a lot of iodine.

However, in the case where iodine or a iodine solution in a hydrogenated naphthalene is continuously or intermittently added to a hydrogenated naphthalene and the reaction is initiated almost at the same time as this addition as is the case with the process of the present invention described below, iodine added is very rapidly reduced to produce hydrogen iodide, and therefore iodine vapor can be effectively prevented from being generated. Accordingly, if only a prescribed amount of iodine is added to react with the hydrogenated naphthalene, hydrogen iodide having a high purity can be produced at a good yield.

The hydrogenated naphthalene used in the process of the present invention is a substance having a structure in which 2 or 4 hydrogen atoms are added to naphthalene and, to be concrete, includes tetrahydronaphthalene and dihydronaphthalene. They may be used singly or in combination of two kinds. Here, tetrahydronaphthalene is a substance called tetralin or 1,2,3,4-tetrahydronaphthalene. Dihydronaphthalene includes the substances in which hydrogens are added to a 1- and 2-positions and 1- and 4-positions. Each of the above compounds may be used in the present invention and provides sufficiently good results.

In the process of the present invention, among the substances described above, tetrahydronaphthalene is more preferably used and gives the very notable effects that it is not only easy to control a progress of the reaction by temperature but also a loss of iodine can be greatly reduced obtaining high purity hydrogen iodide at a good yield.

An amount of the hydrogenated naphthalene used in the process of the present invention will be an equivalent time or more relative to iodine used for the reaction. The amount of less than an equivalent time is not preferred since unreacted iodine is liable to be present in the hydrogenated naphthalene in the course of the reaction and iodine vapor as well as hydrogen iodide is possibly generated. When the hydrogenated naphthalene is used in relatively large quantity, no problems are involved in achieving the objects.

In the production process of the present invention, the reaction is carried out while adding iodine to the hydrogenated naphthalene. The reaction pressure can suitably be selected without being specifically restricted. Usually, ordinary pressures are used in many cases because of an easier operation. The reaction temperature falls in a range of 120° C. to the boiling point of the reaction liquid (for example, about 210° C. when tetrahydronaphthalene is used), preferably 150° C. to the boiling point of the reaction liquid. In this case, a temperature of less than 120° C. retards a progress in the reaction, and when the reaction is carried out at a temperature over a boiling point of the reaction liquid, it is difficult to produce hydrogen iodide under ordinary pressures. In addition, hydrogen iodide obtained is liable to be contaminated with hydrogenated naphthalene. At a temperature near the boiling point of the reaction liquid, the hydrogenated naphthalene vaporizes from the reaction liquid in addition to the generation of hydrogen iodide. These can be sufficiently separated by such well-known methods as passing resulting mixed gas through a cold trap.

In the process of the present invention, iodine may be either continuously or intermittently added to the hydrogenated naphthalene. The adding rate thereof depends largely on the amount and the kind of the hydrogenated naphthalene used, a manner of addition operation, a reaction temperature, a production amount of hydrogen iodide and the shape of a reactor, and can not easily be determined. Usually, the objects of the present invention can be achieved if the rate is such that the color of a gaseous phase at the upper part of the reaction liquid does not assume a brown or purple color.

Further, in adding iodine to the hydrogenated naphthalene, iodine may be added in a solid form such as powder, particle and flake, or it may be charged into the liquid in a gaseous phase.

After finishing the addition of iodine, the reaction liquid is preferably left standing to ripen, whereby the reaction is completed. The time needed for this ripening depends on the temperature thereof and is not fixed. Usually, it is 10 minutes or more, preferably 1 hour or more. The degree of the ripening can easily be judged not only by the lapse of time but also by observing the reaction liquid. That is, the ripening can be regarded as being completed if a brown or purple color of the reaction liquid disappears and hydrogen iodine is no longer generated thereafter (Examples 1 to 6 and Comparative Examples 1 to 2).

Next, in the process for producing crude hydrogen iodide according to the present invention, after dissolving all of iodine in advance in a part of the hydrogenated naphthalene to prepare an iodine solution, the reaction is carried out while adding the resulting solution to the balance of the hydrogenated naphthalene.

In this process, the reaction can be carried out under tight sealing, and therefore air can be prevented from mixing and also iodine can be prevented from sticking to or clogging a feed pipe to the reactor. Accordingly, this process is preferred very much. The solution of iodine and the hydrogenated naphthalene is saturated with iodine (20 weight %/20° C.) or has a lower concentration.

In this case, a reaction pressure, a reaction temperature, a manner of addition of the solution of iodine and the hydrogenated naphthalene and adding rate is the same as for with adding the hydrogenated naphthalene to iodine. And ripening of the reaction liquid is carried out in the same manner.

Further, in the production process of the present invention, a liquid remaining after the reaction described above is divided into two portions, and additional iodine is dissolved in one of these portions to prepare a new solution. Then the reaction is carried out while adding the solution to the other portion of the divided liquid and the same operation is repeated in succession.

In this process, the liquid remaining after the preceding reaction is divided into two portions in a weight ratio falling in a range of (10 to 40):(90 to 60), and the smaller portion of the divided liquids is maintained at temperatures of 120° C. to a boiling point of the liquid (about 210° C.), preferably 150° C. to a boiling point of the liquid (about 210° C.). The reaction is carried out while adding an iodine solution of about 20 to 40 weight % (saturated solution or lower concentration) prepared by dissolving iodine in the other larger portion to the small portion described above. In this case, if the preceding liquids were divided in a ratio out of the range described above, the amount of iodine capable of being dissolved decreases to deteriorate the productivity of hydrogen iodide, and besides, it becomes difficult to maintain the temperature during the reaction.

In the process of the present invention, also when the liquid remaining after the reaction is repeatedly used to carry out the reaction many times, the yield of hydrogen iodide based on iodine added and the purity thereof are very rarely lowered, and almost all of the hydrogenated naphthalene initially charged can effectively be consumed for producing hydrogen iodide (Examples 7 to 8).

Secondly, a refining process for crude hydrogen iodide will be explained.

The kind of a zeolite capable of being used for the refining includes, for example, an A type and a mordenite type. They include various forms such as powder, sphere and pellet, and a zeolite of every form may be used.

A zeolite includes those which are commercially available in the market as Molecular Sieves (trade name manufactured by U.S. Union Carbide Co., Ltd.), and to give the examples thereof, 3A, 4A and 5A of A types, and AW-300 of a mordenite type are commercialized.

In the process of the present invention, a zeolite is required to be subjected to heat treatment at a temperature falling in a range of 200° to 400° C. to activate it. In the heat treatment, it is more effective to carry out it under a reduced pressure. The zeolite after the heat treatment has to be prevented from contacting with air. Because after this treatment the contact of the zeolite with air causes the zeolite to absorb moisture and markedly damages an ability to adsorb impurities contained in hydrogen iodide. Usually, the zeolite after the heat treatment is handled in an inert gas such as nitrogen gas.

In the refining process of the present invention, the zeolite described above is subjected to pretreatment, wherein the zeolite is contacted in advance with crude hydrogen iodide to convert impurities of sulfur components contained in the zeolite to hydrogen sulfide, thereby removing the sulfur components.

The contact of the zeolite with crude hydrogen iodide allows sulfur components contained in the zeolite to be notably reduced by a strong reducing strength of hydrogen iodide particularly at high temperatures of 50° C. or higher to form hydrogen sulfide. The zeolite is preferably subjected to pretreatment, wherein the zeolite is heated to 50° to 500° C., preferably 80° to 200° C. under a pressure of ordinary pressure to 20 atmospheric pressure, and crude hydrogen iodide is passed through it at a flow rate falling in a range of 300 to 1500 hr$^{-1}$ in terms of a space velocity based on the mixed gas of dry nitrogen and crude hydrogen iodide (hereinafter abbreviated as SV) to remove sulfur components contained in the zeolite in a state of hydrogen sulfide. It is suitable that the flow amount of hydrogen iodide is ⅓ or more by weight, preferably ½ or more by weight relative to the amount of the zeolite charged.

An amount less than ⅓ provides the possibility that the sulfur components contained in the zeolite remain without being sufficiently removed (Examples 9 to 12 and Comparative Example 3).

The refining of hydrogen iodide in the process of the present invention is not restricted to a specific system. Usually, a tower or column packed with a zeolite is used, and crude hydrogen iodide is passed through it in a gaseous phase to carry out the refining.

In the refining process of the present invention, crude hydrogen iodide is passed through the zeolite subjected to the pretreatment described above, so that impurities such as moisture and organic substances contained in crude hydrogen iodide can sufficiently be removed.

In this process, a tower or a column packed with the zeolite is used. Operation is carried out under a pressure within a range of ordinary pressure to 20 atmospheric pressure, at a temperature of −30° C. to 100° C., preferably −30° C. to 50° C. and at SV of 300 to 1500$^{-1}$ based on the mixed gas of dry nitrogen and crude hydrogen iodide. Temperatures and pressures outside the above range are not preferred, because an effect to adsorb impurities with the zeolite is reduced.

The use of the present invention can reduce impurities, for example, moisture to 1 ppm or less by volume and organic substances to 0.5 ppm or less by volume.

A zeolite to be used is preferably an A type zeolite having an average pore diameter of 3 to 5 angstrom, and the use thereof can reduce moisture contained in refined hydrogen iodide to 1 ppm or less by volume. More preferably, the A type zeolite having an average pore diameter of 4 angstrom is used. The use thereof can reduce moisture contained in refined hydrogen iodide to 0.1 ppm or less by volume (Examples 14 to 17).

It is sufficiently possible to reuse the zeolite used as an adsorbing agent by regenerating with well-known methods such as thermal swing, pressure swing, purge gas stripping and displacement after it is used to the break point. Generally thermal swing cycle is employed.

Further, in the refining process of the present invention, organic substances can be removed more preferably by combining a zeolite with an activated carbon, thereby reducing the concentration of the organic substances contained in refined hydrogen iodide to 0.2 ppm or less.

The contact of activated carbon with hydrogen iodide causes sulfur components contained in the activated carbon to be reduced by a strong reducing strength of hydrogen iodide to form hydrogen sulfide as in the case with zeolite. Accordingly, activated carbon is subjected to pretreatment which is effectuated by heating it at 50° to 500° C., preferably 80° to 200° C. under ordinary pressure to 20 atmospheric pressure, and passing hydrogen iodide through it at SV of 300 to 1500 hr$^{-1}$ based on the mixed gas of dry nitrogen and crude hydrogen iodide. The suitable flow amount of crude hydrogen iodide is ⅓ or more by weight, more preferably ½ or more by weight based on the amount of the activated carbon charged. The amount outside the above range provides the possibility that the sulfur components contained in the activated carbon remain without being sufficiently removed (Example 13).

In the present invention, the operation is carried out in the conditions described above, whereby impurities such as moisture and organic substances contained in crude hydrogen iodide can sufficiently be removed, and a particularly notable effect to obtain hydrogen iodide having a high purity is given.

Refined hydrogen iodide produced by the process of the present invention is useful as a dry etching agent in the field of electronic devices represented by semiconductors and liquid crystals.

EXAMPLES

The present invention will be explained below in conjunction with examples and comparative examples. There will be described, "the production process of crude hydrogen iodide" in Examples 1 to 8 and Comparative Examples 1 and 2, "pretreatment of a zeolite or activated carbon with crude hydrogen iodide" in Examples 9 to 13 and Comparative Example 3, and "refining process of crude hydrogen iodide" in Examples 14 to 18, respectively.

Hereinafter, "%" is by weight, and "ppm" is by volume. The yield of hydrogen iodide is a value calculated based on the amount of iodine newly used in the formation reaction thereof. Determined were moisture with a dew-point hygrometer, organic components with a high-performance liquid chromatography (HPLC) and hydrogen sulfide with a gas detecting tube, respectively.

Example 1

A flask of 500 ml was charged with tetrahydronaphthalene of 100 g and heated to 210° C. while stirring. Flaky solid iodine of 20.0 g was continuously added thereto over a period of one hour while maintaining the above temperature to react them. Gas generated as the reaction went on was solidified by passing through cold traps cooled to −30° C. and −60° C. or lower to obtain crude hydrogen iodide. After finishing the addition of iodine, the reaction liquid was left standing at 210° C. for 15 minutes to ripen. The color of the reaction liquid which had been purple disappeared during that time, and it was confirmed that almost all amount of iodine had been consumed. Crude hydrogen iodide of 19.7 g was obtained. The purity thereof was 99.5% or more, and the yield thereof was 97.8%. The results thereof are summarized in Table 1.

Example 2

A flask of 100 ml was charged with flaky solid iodine of 20.0 g, and gaseous iodide was generated by heating at 120° C. A flask of 500 ml was charged with tetrahydronaphthalene of 100 g and heated to 200° C. while stirring. The gaseous iodine was continuously introduced thereinto over a period of 2 hours while maintaining the above temperature to react them. Gas generated as the reaction went on was solidified by passing through the cold traps cooled to −30° C. and −60° C. or lower to obtain crude hydrogen iodide. After finishing the introduction of iodine, the reaction liquid was left standing at 200° C. for 15 minutes to ripen. Crude hydrogen iodide of 19.8 g was obtained. The purity thereof was 99.5% or more, and the yield thereof was 98.0%. The results thereof are summarized in Table 1.

Example 3

The same operation that carried out in Example 1 was repeated to obtain crude hydrogen iodide, except that the reaction temperature and the ripening temperature of the reaction liquid were changed to 200° C., respectively. The amount of the crude hydrogen iodide was 19.8 g. The purity thereof was 99.5% or more, and the yield thereof was 98.0%. The results thereof are summarized in Table 1.

Example 4

Flaky solid iodine of 20.0 g was dissolved in tetrahydronaphthalene of 100 g charged in a flask of 500 ml at 40° C. to prepare a tetrahydronaphthalene solution of iodine. A flask of 500 ml was charged with tetrahydronaphthalene of 100 g and heated to 200° C. while stirring. The iodine solution prepared above was continuously added thereto over a period of 2 hours while maintaining the above temperature to react them. Gas generated as the reaction went on was solidified by passing through the cold traps cooled to −30° C. and −60° C. or lower to obtain crude hydrogen iodide. After finishing the addition of the iodine solution, the reaction liquid was left standing at 200° C. for 15 minutes to ripen. Crude hydrogen iodide of 19.8 g was obtained. The purity thereof was 99.5% or more, and the yield thereof was 98.0%. The results thereof are summarized in Table 1.

Example 5

The same operation that was carried out in Example 1 was repeated to obtain crude hydrogen iodide, except that solid iodine of 20.0 g was divided into five portions of each 4.0 g and added intermittently five times. The amount of the crude hydrogen iodide was 19.6 g. The purity thereof was 99.5% or more, and the yield thereof was 97.2%. The results thereof are summarized in Table 1.

TABLE 1

|  |  | Example |  |  |  |  |
| --- | --- | --- | --- | --- | --- | --- |
|  |  | 1 | 2 | 3 | 4 | 5 |
| Tetrahydro- | (g) | 100 | 100 | 100 | 200 | 100 |

TABLE 1-continued

|  |  | Example | | | | |
|---|---|---|---|---|---|---|
|  |  | 1 | 2 | 3 | 4 | 5 |
| naphthalene | (mole) | 0.76 | 0.76 | 0.76 | 1.52 | 0.76 |
| Iodine | (g) | 20 | 20 | 20 | 20 | 4 × 5 |
|  | (mole) | 0.079 | 0.079 | 0.079 | 0.079 | 0.079 |
| Phase |  | Solid | Gas | Solid | Solution | Solid |
| Addition manner |  | Cont. | Cont. | Cont. | Cont. | Int.* |
| Reaction temperature | (°C.) | 210 | 200 | 200 | 200 | 210 |
| Reaction time | (hrs) | 1 | 2 | 1 | 2 | 1 |
| Hydrogen iodide |  |  |  |  |  |  |
| Purity (%) |  |  | 99.5 % or more | | | |
| Yield (%) |  | 97.8 | 98.0 | 98.0 | 98.0 | 97.2 |

Cont.: Continuously,
Int.: Intermittently
*: 5 times

Example 6

The same operation that was carried out in Example 1 was repeated to obtain crude hydrogen iodide, except that tetrahydronaphthalene was replaced with dihydronaphthalene. The amount of the crude hydrogen iodide was 19.7 g. The purity thereof was 99.5% or more, and the yield thereof was 97.7%. The results thereof are summarized in Table 2.

Comparative Example 1

Flaky solid iodine of 20.0 g was dissolved in tetrahydronaphthalene of 100 g charged in a flask of 500 ml at 40° C. to prepare a tetrahydronaphthalene solution of iodine. This iodine solution was heated up to 210° C. to react them for one hour. Resulting gas was solidified by passing through the cold traps cooled at −30° C. and −60° C. or lower to obtain crude hydrogen iodide. Gas generated during this reaction was purple, and iodine was observed to be accompanied therewith. Further, iodine sticked to the inside of a gas discharging tube, and clogging was apt to take place. The amount of resulting crude hydrogen iodide was 14.2 g. The purity thereof was 82.5% or more, and the yield was 70.3%. The results thereof are summarized in Table 2.

Comparative Example 2

The same operation that was carried out in Example 4 was repeated to obtain crude hydrogen iodide, except that instead of adding the iodine solution of 40° C. to tetrahydronaphthalene of 200° C., the latter kept at room temperature was added intermittently by 1/10 portions to the former ten times while maintaining 160°–200° C. in contrast with the above manner. During the reaction iodine was observed to be accompanied therewith. Further, iodine sticked to the inside of a gas discharging tube and was apt to clog the tube. The amount of resulting crude hydrogen iodide was 16.0 g. The purity thereof was 85.5% or more, and the yield was 79.4%. The results thereof are summarized in Table 2.

Example 7

Flaky solid iodine of 40 g was dissolved in tetrahydronaphthalene of 160 g charged in a flask of 500 ml at 40° C. to prepare a tetrahydronaphthalene solution of iodine. A flask of 500 ml was charged with tetrahydronaphthalene of 40 g and heated to 200° C. while stirring. The iodine solution prepared above was continuously added thereto over a period of 2 hours while maintaining the above temperature to react them. Crude hydrogen iodide gas generated as the reaction went on was introduced into a 10% sodium hydroxide aqueous solution of 1 liter to absorb the whole amount thereof. A weight change in this aqueous solution was measured with the lapse of time, and the end point of the first reaction was set at the point where the change thereof was not observed. The yield of the crude hydrogen iodide was 94.6%, and the purity thereof was 99.5% or more. The concentrations of organic components and water contained therein were 200 ppm and 30 ppm, respectively. The concentrations of tetrahydronaphthalene and naphthalene contained in the liquid remaining after the reaction were 94.1% and 5.2%, respectively. The results thereof are summarized in Table 2 and Table 3.

Next, the second reaction was carried out, wherein the liquid remaining after the first reaction described above was divided into two portions by 1:4 (weight ratio); the smaller portion was maintained at 200° C.; and a solution prepared by adding new iodine of 40 g to the liquid of the other large portion was continuously added the small portion over a period of 2 hours to react them. Resulting hydrogen iodide gas was treated in the same manner as in the first reaction to determine the yield and measure the concentration of a liquid remaining after this second reaction. The results thereof are summarized in Table 3.

Further, the liquid remaining after the reactions was still used to repeat the operation in the same manner as described above, and the third to eighth reactions were carried out. The yields of crude hydrogen iodide thus obtained and the concentrations of the liquids remaining after the reactions are summarized in Table 3.

Example 8

The same operation that was carried out in Example 7 was repeated to carry out the first to eighth reactions, except that the reaction temperature was changed from 200° C. to 170° C. (Table 2). The yields of resulting crude hydrogen iodide and the concentrations of the liquids remaining after the reactions are summarized in Table 3.

TABLE 2

|  |  | Example | | | Comparative example | |
|---|---|---|---|---|---|---|
|  |  | 6 | 7 | 8 | 1 | 2 |
| Tetrahydro- | (g) | — | 200 | 200 | 100 | 200 |
| naphthalene | (mole) | — | 1.52 | 1.52 | 0.76 | 1.52 |
| Dihydro- | (g) | 100 | — | — | — | — |
| naphthalene | (mole) | 0.77 | — | — | — | — |
| Iodine | (g) | 20 | 40 | 40 | 20 | 20 |
|  | (mole) | 0.079 | 0.16 | 0.16 | 0.079 | 0.079 |
| Phase |  | Solid | Solution | Solution | Solution | Solution |
| Addition manner |  | Cont. | Cont. | Cont. | One lot | Int.* |
| Reaction temperature | (°C.) | 210 | 200 | 170 | 210 | 160–200 |
| Reaction time | (hrs) | 1 | 2 | 2 | 1 | 2 |
| Hydrogen iodide |  |  |  |  |  |  |
| Purity (%) |  | 99.5 % or more | | | 82.5 | 85.5 |
| Yield (%) |  | 97.7 | 94.6 | 97.5 | 70.3 | 79.4 |

Cont.: Continuously,
Int: Intermittently
*10 times

TABLE 3

|  | Yield of | Liquid concentration after reaction (%) | | |
|---|---|---|---|---|
| Reaction | HI (%) | Tetrahydro-naphthalene | Naphthalene | Total |

| times | 7 | 8 | 7 | 8 | 7 | 8 | 7 | 8 |
|---|---|---|---|---|---|---|---|---|
| 1 | 94.6 | 97.5 | 94.1 | 94.3 | 5.2 | 4.8 | 99.3 | 99.1 |
| 2 | 95.5 | 97.2 | 91.4 | 89.1 | 8.5 | 9.6 | 99.9 | 98.7 |
| 3 | 96.9 | 98.0 | 86.1 | 83.8 | 13.5 | 14.3 | 99.6 | 98.1 |
| 4 | 97.5 | 98.0 | 78.9 | 78.5 | 20.3 | 18.6 | 99.2 | 97.1 |
| 5 | 96.5 | 97.9 | 73.4 | 72.6 | 25.4 | 22.2 | 98.8 | 94.8 |
| 6 | 96.6 | 97.6 | 68.6 | 67.2 | 30.7 | 26.2 | 99.3 | 93.4 |
| 7 | 97.4 | 97.4 | 63.2 | 56.9 | 35.6 | 33.9 | 98.8 | 90.8 |
| 8 | 96.6 | 96.3 | 55.0 | 52.3 | 38.8 | 37.4 | 93.8 | 89.7 |

Example 9

The pretreatment of a zeolite was carried out in the following manner.

Used were crude hydrogen iodide which had been obtained in the first reaction of Example 7 (purity: 99.5% or more, organic components: 200 ppm, and moisture: 30 ppm) and zeolite which had been obtained by drying Molecular Sieves 4A (trade name, manufactured by Union Showa Co., Ltd.). Equipped in series were a glass-made column (inner diameter: 25 mm) filled with the zeolite of 20 g and an absorbing bottle charged with demineralized water of 400 ml.

First, crude hydrogen iodide of 10 g (crude hydrogen iodide/zeolite: ½ weight ratio) was passed through this column at a temperature of 100° C. and SV of 300 hr$^{-1}$. Then, gas dissolved in the aqueous solution contained in the absorbing bottle was expelled by bubbling dry nitrogen to collect the gas in a gas sampling bag (1 liter). The concentration of hydrogen sulfide in the resulting mixed gas was 120 ppm based on crude hydrogen iodide.

Next, crude hydrogen iodide of 10 g was again passed through the column through which crude hydrogen iodide was once passed as described above at room temperature and SV of 300 hr$^{-1}$. Then gas dissolved in the aqueous solution contained in the absorbing bottle was expelled by bubbling dry nitrogen to collect the mixed gas. The concentration of hydrogen sulfide in the gas was 1 ppm or less based on crude hydrogen iodide.

The zeolite treated by crude hydrogen iodide as described above is used in Example 14 and Example 18, respectively.

Examples 10 to 13

The same operation as carried out in Example 9 was repeated to collect two kinds of mixed gas, except that the kind of the zeolite was changed to Molecular Sieves 3A (trade name, manufactured by Union Showa Co., Ltd.) (Example 10) and Molecular Sieves 5A (ditto) (Example 11), or AW-300 (ditto) (Example 12), or the zeolite was changed to an activated carbon (trade name: 4GS-S, manufactured by Tsurumi Coal Co., Ltd.) (Example 13). The concentrations of hydrogen sulfide contained in these mixed gases were 130 ppm and 1 ppm or less in Example 10, 120 ppm and 1 ppm or less in Example 11, 150 ppm and 1 ppm or less in Example 12, and 250 ppm and 1 ppm or less in Example 13, respectively, based on crude hydrogen iodide.

Three kinds of the zeolite and one kind of the activated carbon each treated in the foregoing manners are used in Examples 15 to 18, respectively.

Comparative Example 3

The same operation as carried out in Example 9 was repeated to collect two kinds of mixed gas, except that the amount of crude hydrogen iodide was changed to 5 g, that is, crude hydrogen iodide/zeolite=¼ (weight ratio). The concentrations of hydrogen sulfide contained in these mixed gases were 120 ppm and 15 ppm, respectively, based on crude hydrogen iodide.

Examples 14 to 17

Used were crude hydrogen iodide which had been obtained in the first reaction of Example 7 (purity: 99.5% or more, organic components: 200 ppm, and moisture: 30 ppm) and the zeolite which had been treated with crude hydrogen iodide in Examples 9 to 12. Equipped in series were a glass-made column (inner diameter: 25 mm) filled with the zeolite of 50 g and an absorbing bottle charged with demineralized water of 400 ml.

Crude hydrogen iodide of 20 g (crude hydrogen iodide/zeolite: ⅖ weight ratio) accompanied by dry nitrogen was passed through this column at a temperature of 30° C., ordinary pressure, and SV of 600 hr$^{-1}$. The concentrations of impurities (organic components and moisture) based on crude hydrogen iodide were as follows at the column exit during that time. That is, the organic components were 0.5 ppm or less and the moisture was 0.1 ppm or less in Example 14; and the organic components were 0.5 ppm or less and the moisture was 1 ppm or less in Examples 15 to 17. Hydrogen sulfide was not detected in every case.

Example 18

Used were crude hydrogen iodide which had been obtained in the first reaction of Example 7 (purity: 99.5% or more, organic components: 200 ppm, and moisture: 30 ppm), the zeolite which had been treated with crude hydrogen iodide in Example 9, and the activated carbon which had been treated with crude hydrogen iodide in Example 13. Equipped in series were a glass-made column (inner diameter: 25 mm) of the first stage filled with the zeolite of 50 g, a glass-made column (inner diameter: 25 mm) of the second stage filled with the activated carbon of 10 g, and an absorbing bottle charged with demineralized water of 400 ml.

Crude hydrogen iodide of 20 g (crude hydrogen iodide/zeolite: ⅖ weight ratio, and crude hydrogen iodide/activated carbon: ⅕ weight ratio) accompanied by dry nitrogen was passed through from the column inlet of the first stage at a temperature of 30° C., ordinary pressure, and SV of 600 hr$^{-1}$. The concentrations of impurities were 0.2 ppm or less for the organic components and 0.1 ppm or less for the moisture based on crude hydrogen iodide, at the column exit of the second stage during the above operation.

What is claimed is:

1. A process for producing refined hydrogen iodide, said process comprising the steps of:
   (a) contacting a zeolite containing sulfur impurities therein with crude hydrogen iodide at conditions effective to convert said sulfur impurities to hydrogen sulfide including a temperature of 50° C. or higher to remove said sulfur impurities from said zeolite; and
   (b) contacting additional crude hydrogen iodide with the zeolite from step (a) in a gaseous phase at condition effective to remove impurities in said additional crude hydrogen iodide to produce refined hydrogen iodide which contains 1 ppm by volume or less of hydrogen sulfide.

2. A process for producing refined hydrogen iodide according to claim 1, wherein the crude hydrogen iodide is obtained by dissolving iodine in hydrogenated naphthalene to form an iodine solution, and continuously or intermittently adding the iodide solution to additional hydrogenated naphthalene at conditions effective to react the iodine with the hydrogenated naphthalene to form crude hydrogen iodide.

3. A process for producing refined hydrogen iodide according to claim 2, further comprising (c) dividing liquid remaining after the reaction of iodide with hydrogenated naphthalene into a first portion and a second portion, (d) dissolving additional iodine in the first portion to form a new iodide solution, (e) adding the new iodide solution continuously or intermittently to the second portion at conditions effective to react the additional iodide with the hydrogenated naphthalene to form additional crude hydrogen iodide, and (f) repeating steps (c)–(e).

4. A process for producing refined hydrogen iodide according to claim 1, wherein the amount of the crude hydrogen iodide used to remove the sulfur impurities contained in the zeolite is at least ⅓ of the weight of the zeolite.

5. A process for producing refined hydrogen iodide according to claim 1, wherein the zeolite is an A type zeolite or a mordenite type zeolite.

6. A process for producing refined hydrogen iodide according to claim 5, wherein said A type zeolite has an average pore diameter of 3 angstrom, 4 angstrom, or 5 angstrom.

7. A process for producing refined hydrogen iodide according to claim 6, wherein said A type zeolite has an average pore diameter of 4 angstrom.

8. A process for producing refined hydrogen iodide according to claim 5, wherein the refined hydrogen iodide contains 1 ppm by volume or less of water, and 1 ppm by volume or less of organic substances.

9. A process for producing refined hydrogen iodide according to claim 6, wherein the refined hydrogen iodide contains 0.5 ppm by volume or less of organic substances.

10. A process for producing refined hydrogen iodide according to claim 7, wherein the refined hydrogen iodide contains 0.1 ppm by volume or less of water.

11. A process for producing refined hydrogen iodide according to claim 6, wherein the zeolite is used in combination with an activated carbon, and the crude hydrogen iodide is contacted with the combination of the zeolite and the activated carbon at conditions effective to produce a refined hydrogen iodide containing 0.2 ppm by volume or less of organic substances.

12. A process for producing refined hydrogen iodide according to claim 11, wherein the activated carbon is first contacted with crude hydrogen iodide at conditions effective to convert sulfur impurities contained in the activated carbon to hydrogen sulfide to remove said sulfur impurities from the activated carbon.

13. A process for producing refined hydrogen iodide according to claim 12, wherein the amount of the crude hydrogen iodide used to remove the sulfur impurities contained in the activated carbon is at least ⅓ of the weight of the activated carbon.

14. A process for producing refined hydrogen iodide according to claim 2, wherein the amount of the crude hydrogen iodide used to remove the sulfur impurities contained in the zeolite is at least ⅓ of the weight of the zeolite.

15. A process for producing refined hydrogen iodide according to claim 2, wherein the zeolite is an A type zeolite or a mordenite type zeolite.

16. A process for producing refined hydrogen iodide according to claim 15, wherein said A type zeolite has an average pore diameter of 3 angstrom, 4 angstrom, or 5 angstrom.

17. A process for producing refined hydrogen iodide according to claim 16, wherein said A type zeolite has an average pore diameter of 4 angstrom.

18. A process for producing refined hydrogen iodide according to claim 15, wherein the refined hydrogen iodide contains 1 ppm by volume or less of water, and 1 ppm by volume or less of organic substances.

19. A process for producing refined hydrogen iodide according to claim 16, wherein the refined hydrogen iodide contains 0.5 ppm by volume or less of organic substances.

20. A process for producing refined hydrogen iodide according to claim 17, wherein the refined hydrogen iodide contains 0.1 ppm by volume or less of water.

21. A process for producing refined hydrogen iodide according to claim 16, wherein the zeolite is used in combination with an activated carbon, and the crude hydrogen iodide is contacted with the combination of the zeolite and the activated carbon at conditions effective to produce a refined hydrogen iodide containing 0.2 ppm by volume or less of organic substances.

22. A process for producing refined hydrogen iodide according to claim 21, wherein the activated carbon is first contacted with crude hydrogen iodide at conditions effective to convert sulfur impurities contained in the activated carbon to hydrogen sulfide to remove said sulfur impurities from the activated carbon.

23. A process for producing refined hydrogen iodide according to claim 20, wherein the amount of the crude hydrogen iodide used to remove the sulfur impurities contained in the activated carbon is at least ⅓ of the weight of the activated carbon.

* * * * *